United States Patent [19]
Flautt et al.

[11] Patent Number: 5,700,574
[45] Date of Patent: Dec. 23, 1997

[54] SIZING COMPOSITION FOR GLASS ROVING

[75] Inventors: Martin C. Flautt, Granville; Leonard J. Adzima, Pickerington, both of Ohio; Douglas B. Mann, Evans, Ga.

[73] Assignee: Owens-Corning Fiberglas Technology, Inc., Summit, Ill.

[21] Appl. No.: 485,746

[22] Filed: Jun. 7, 1995

Related U.S. Application Data

[63] Continuation-in-part of Ser. No. 291,801, Aug. 17, 1994, abandoned.

[51] Int. Cl.⁶ .................. B32B 9/00; C08J 00/00
[52] U.S. Cl. .................. 428/392; 428/375; 428/391; 524/219; 524/524
[58] Field of Search .................. 428/392, 391, 428/378, 375; 524/219, 524

[56] References Cited

U.S. PATENT DOCUMENTS

| | | |
|---|---|---|
| 2,635,389 | 4/1953 | Toulmin, Jr. . |
| 2,886,552 | 4/1959 | Whitehurst . |
| 3,349,222 | 10/1967 | Johnston . |
| 3,414,711 | 12/1968 | Guyet et al. . |
| 3,620,701 | 11/1971 | Janetos et al. . |
| 3,717,448 | 2/1973 | Smith . |
| 3,865,565 | 2/1975 | Spenie et al. . |
| 3,865,768 | 2/1975 | Mohr . |
| 3,887,347 | 6/1975 | Reese . |
| 3,890,127 | 6/1975 | Siegmund . |
| 3,905,185 | 9/1975 | Bauer et al. . |
| 3,918,947 | 11/1975 | Maaghul et al. . |
| 3,936,996 | 2/1976 | Schifler . |
| 3,968,068 | 7/1976 | Haggerty .................. 428/392 |
| 3,996,033 | 12/1976 | Chickowski . |
| 4,013,435 | 3/1977 | Kane et al. . |
| 4,027,071 | 5/1977 | Motsinger et al. .................. 428/392 |
| 4,038,243 | 7/1977 | Maaghal .................. 525/40 |
| 4,042,360 | 8/1977 | Kane et al. . |
| 4,178,412 | 12/1979 | Sage et al. .................. 428/392 |
| 4,193,782 | 3/1980 | Aulich et al. . |
| 4,236,323 | 12/1980 | Dammaun et al. . |
| 4,295,871 | 10/1981 | Droux et al. . |
| 4,309,202 | 1/1982 | Parbhoo . |
| 4,309,326 | 1/1982 | Sage et al. .................. 428/392 |
| 4,440,557 | 4/1984 | Morrison et al. . |
| 4,461,804 | 7/1984 | Motsinger et al. . |
| 4,637,956 | 1/1987 | Das et al. . |
| 4,745,028 | 5/1988 | Das et al. . |
| 4,795,678 | 1/1989 | Girgis . |
| 4,853,021 | 8/1989 | Soska et al. . |
| 4,927,445 | 5/1990 | Soska et al. . |
| 5,049,407 | 9/1991 | Soska et al. . |
| 5,055,119 | 10/1991 | Flault et al. . |
| 5,120,780 | 6/1992 | Mortino et al. . |
| 5,171,634 | 12/1992 | Soska et al. . |
| 5,181,947 | 1/1993 | Mizuno et al. . |
| 5,237,083 | 8/1993 | Martino et al. . |
| 5,298,576 | 3/1994 | Sumida et al. . |
| 5,326,793 | 7/1994 | Gallucci et al. . |

FOREIGN PATENT DOCUMENTS

| | | |
|---|---|---|
| 554173 | 8/1993 | European Pat. Off. . |
| 216493 | 3/1983 | Germany . |
| 63-265839 | 4/1987 | Japan . |

*Primary Examiner*—Patrick Ryan
*Assistant Examiner*—J. M. Gray
*Attorney, Agent, or Firm*—C. Michael Gegenheimer; Inger H. Eckert

[57] ABSTRACT

A sizing composition for glass is provided. The sizing composition comprises a vinyl acetate copolymer emulsion, a polyvinyl acetate copolymer latex, and a vinyl acrylic copolymer emulsion.

20 Claims, 4 Drawing Sheets

SIZING COMPOSITION FOR GLASS ROVING

CROSS-REFERENCE TO RELATED APPLICATIONS

This application is a continuation-in-part of U.S. patent application Ser. No. 08/291,801, filed Aug. 17, 1994, now abandoned, the disclosure of which is hereby incorporated by reference.

BACKGROUND OF THE INVENTION

The present invention relates generally to a sizing composition for glass fibers and, more particularly, to a sizing composition for glass roving such as gun roving.

Glass fibers are useful in a variety of technologies. For example, glass fibers are commonly used as reinforcements in polymer matrices to form glass fiber reinforced plastics or composites.

As is known in the art, glass fibers which are intended for use as reinforcements usually require a size. The size, also commonly referred to as "sizing composition," serves to provide a lubricating quality to the individual fibers which provides them with abrasion resistance. Glass fibers are susceptible to breakage if scratched or otherwise damaged. Scratches and surface defects sometimes occur as the fibers come into contact with one another during fiber production. The breakage of a single fiber during the manufacture of a plurality of glass fibers (e.g., 5000 fibers) interrupts fiber production. In order to reduce breakage and other related problems, size is applied to the fibers during fiber production. That is, the glass fibers are sized with a protective material substantially immediately after they are formed.

Continuous glass fibers are commonly manufactured by supplying continuous streams of molten glass from a bushing, drawing the streams into a plurality of glass fibers, and applying a size, usually aqueous based, to the fibers via an applicator roller. The sized fibers are gathered into separate strands. The strands are then brought together at a gathering shoe and wound on a collet to produce a glass fiber package. The glass fiber package is then transferred via a carrier device to a heated enclosure, such as an oven, where water is evaporated from the aqueous-based size.

The resulting glass fiber packages can be shipped to another location for production of a finished glass fiber reinforcement product. The glass fiber package must be separated into separate bundles of fibers ("rovings") to be used. These rovings can then be combined with a plastic or resin material to form a final product. The process of producing separate rovings prior to forming a finished glass fiber reinforcement product is time consuming and results in higher production costs.

Accordingly, a need still exists for an improved sizing composition which will allow a roving product to be produced using fewer process steps.

SUMMARY OF THE INVENTION

This need is met by the present invention, whereby an improved sizing composition is provided which reduces the processing steps required to produce a glass roving. The present invention further provides an improved sized glass fiber.

In accordance with a first aspect of the present invention, a sizing composition for glass is provided. The sizing composition comprises a vinyl acetate copolymer emulsion, a polyvinyl acetate copolymer latex, and a vinyl acrylic copolymer emulsion.

Preferably, the vinyl acetate copolymer emulsion is present in the sizing composition in a solids weight percent of from 2.5 to 12.5 percent. More preferably, it is present in the sizing composition in a solids weight percent of from 5 to 7.5 percent. Most preferably, the vinyl acetate copolymer emulsion is present in the sizing composition in a solids weight percent of about 6.5 percent.

Preferably, the polyvinyl acetate copolymer latex is present in the sizing composition in a solids weight percent of from about 0.25 to about 2.5 percent. More preferably, it is present in the sizing composition in a solids weight percent of from about 0.5 to about 1.5 percent. Most preferably, the polyvinyl acetate copolymer latex is present in the sizing composition in a solids weight percent of about 1 percent.

Preferably, the vinyl acrylic copolymer emulsion is present in the sizing composition in a solids weight percent of from about 0.25 to about 2.5 percent. More preferably, the vinyl acrylic copolymer emulsion is present in the sizing composition in a solids weight percent of from about 0.5 to about 1.5 percent. Most preferably, the vinyl acrylic copolymer emulsion is present in the sizing composition in a solids weight percent of about 1 percent.

The sizing composition may also include one or more silane coupling agents. In addition, the sizing composition may further comprise a lubricant. The lubricant is preferably selected from the group consisting of amines and fatty acid esters.

The sizing composition may further optionally include an antistatic agent and/or a wetting agent. Also, the sizing composition may further include acetic acid.

In accordance with a second aspect of the present invention, an improved sized glass fiber is provided. The composition comprises glass fiber coated with a sizing composition comprising a vinyl acetate copolymer emulsion, a polyvinyl acetate copolymer latex, and a vinyl acrylic copolymer emulsion.

DETAILED DESCRIPTION OF THE INVENTION

Figure 1:
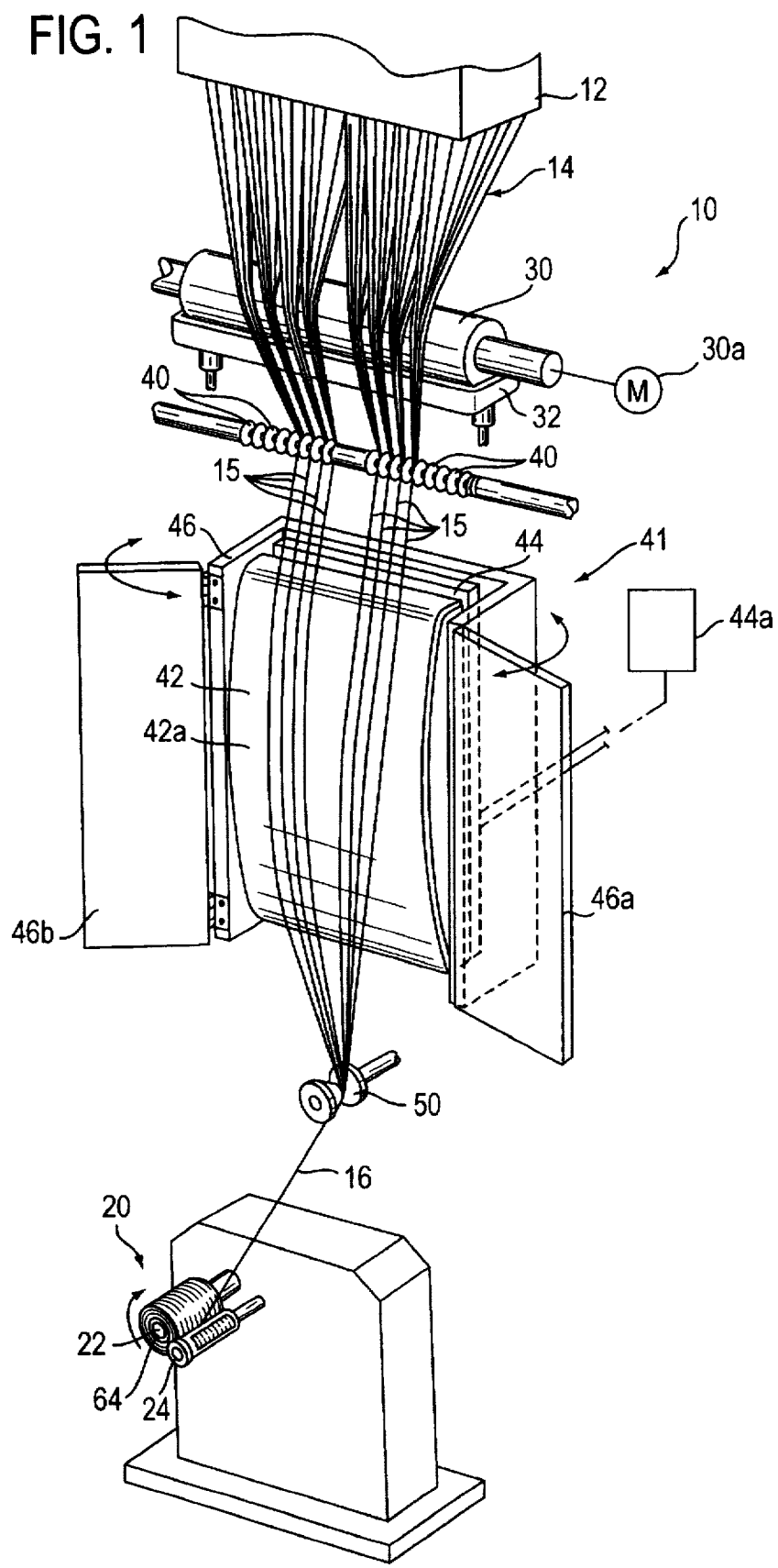
FIG. 1 is a perspective view of a glass fiber package forming apparatus constructed in accordance with a first embodiment of the present invention.

An apparatus for producing a glass fiber package in accordance with the present invention is shown in FIG. 1, and is generally designated by the reference numeral 10. The apparatus 10 comprises a bushing 12 having a number of orifices (not shown) through which a plurality of streams of molten glass are discharged. The orifices may be extended by hollow studs or tips (not shown). The streams of glass are mechanically drawn to form continuous fibers 14 via a winder device 20.

The fibers 14 pass over an applicator roller 30 which applies a liquid coating of sizing composition (also referred to herein as size) to the fibers 14. Sizing compositions are typically aqueous based, but may be of any other suitable type. A trough 32 containing the sizing composition is positioned below the roller 30. The roller 30 extends into the trough 32 and, as it is rotated by a conventional drive device 30a, transfers sizing composition from the trough 32 to the fibers 14. Other devices or techniques for applying size to the glass fibers 14 may be used in place of the applicator roller 30.

In the illustrated embodiment, the sized fibers 14 are split into discrete bundles 15 via primary or first shoes 40. The shoes 40 are formed from a ceramic material.

From the shoes 40, the fibers 14 pass over and contact a heating device 41. The heating device 41 comprises a first plate 42 (also referred to herein as a contact plate) having a curved outer surface 42a which is directly contacted by the fibers 14. A resistance-heated second plate 44, which is connected to a power supply 44a, is spaced a small distance from the first plate 42 and serves to radiantly heat the first plate 42. As the fibers 14 pass over the first plate 42, energy in the form of heat is transferred from the first plate 42 to the sized fibers 14. When an aqueous based size is employed, the heat transferred from the first plate 42 to the fibers 14 evaporates water from the size and coalesces the size composition into a film which bonds the glass fibers in the bundle together.

Figure 2:
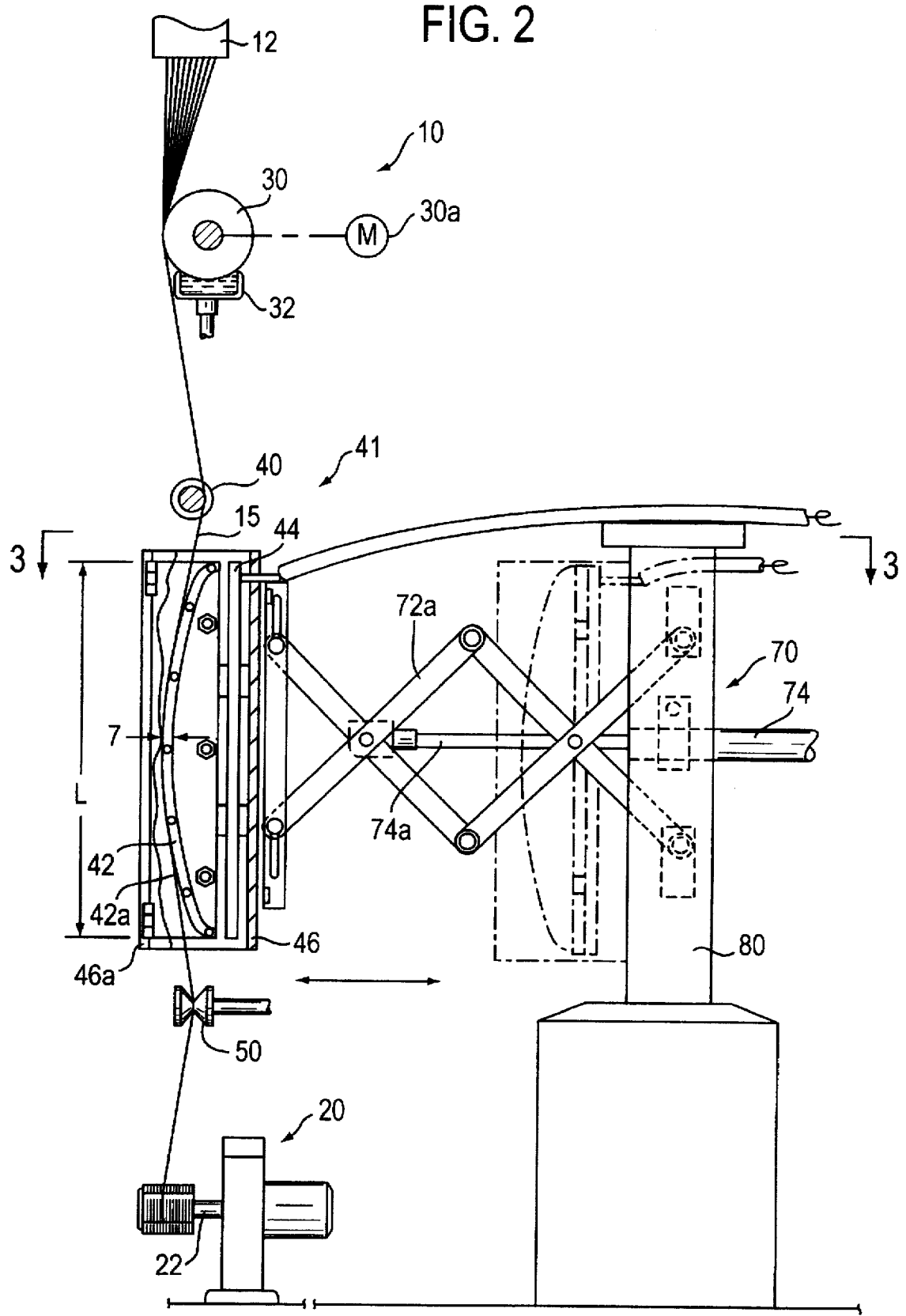
FIG. 2 is a side view of the apparatus illustrated in FIG. 1.

The first plate 42 may have a length L=15.0 inches, a thickness T=0.25 inch, and a radius of curvature equal to 50.0 inches, see FIG. 2. The plate 42 is formed from metal, such as stainless steel or copper. Preferably, the plate 42 is maintained at a temperature of between 1000° F. and 1500° F., and most preferably at a temperature of 1300° F.

In accordance with one embodiment of the present invention, the size comprises: water; a film former; one or more coupling agents, such as silane coupling agents which are commercially available from OSI Specialties Inc. under the product names A1100 and A174; one or more lubricants such as a fatty acid ester which is commercially available from the Stepan Co. under the product name KESSCO BES, and an amine lubricant which is commercially available from the Henkel Corporation under the product name EMERY 6760U; a wetting agent, an example of which is commercially available from Rhone-Poulenc under the product name IGEPAL CA630; an antistatic agent, an example of which is commercially available from PPG Specialty Chemical under the product name LAROSTAT 264A; and acetic acid. The acetic acid is used to acidify the aqueous solution, allowing the silane coupling agents to hydrolyze. Preferably, the film former comprises a mixture of a crosslinking vinyl acrylic copolymer emulsion, which is commercially available from Franklin International under the product name COVINAX 27A, a vinyl acetate copolymer emulsion, which is commercially available from Franklin International under the product name DURACET 1512, and a polyvinyl acetate copolymer latex, which is commercially available from Franklin International under the product name DURACET 675-01.

The commercially available products listed above are received from the manufacturer at the following solids weight percents: A1100 silane: 61% solids, A174 silane: 82% solids, KESSCO BES: 100% solids, EMERY 6760U: 50% solids, IGEPAL CA630: 100% solids, LAROSTAT 264A: 100% solids, COVINAX 27A: 49% solids, DURACET 1512: 52% solids, DURACET 675-01: 55% solids.

After passing over the first plate 42, the fiber bundles 15 are gathered together via a gathering shoe 50 to form a single tow 16. From the gathering shoe 50, the tow 16 is wound via the winder device 20, a Type-30® winder device in the illustrated embodiment, onto a sleeve or tube 64, see FIGS. 1 and 5, to form a glass fiber package 60 (shown in FIG. 4). The winder device 20 comprises a rotatable member or a collet 22, upon which is provided the removable tube 64. The winder device 20 also includes a conventional traversing mechanism 24 to distribute the tow 16 along the length of the tube 64 to form a square-edge package. By winding the tow 16 into a square-edge package, unacceptable catenary is substantially eliminated.

Figure 4:
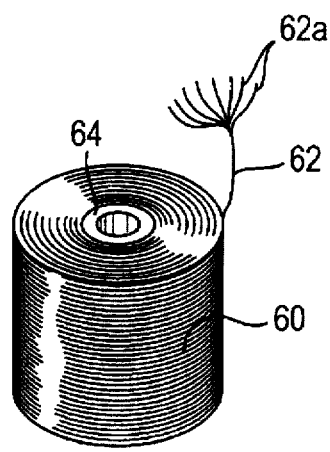
FIG. 4 is a perspective view of a glass fiber package formed in accordance with the present invention.

The glass fiber package 60 shown in FIG. 4 comprises a gun roving product. Strand 62 extending from the package 60 is separable into discrete bundles 62a. Each bundle 62a comprises a plurality of fibers which are adhered to one another via the size composition applied by the applicator roller 30.

While a gun roving product is shown in the illustrated embodiment, it is further contemplated that other products may also be produced using the heating device 41. For example, a single-end product, such as a Type-30® product (a square-edge shippable forming product), may be formed using the heating device 41. A sizing composition having a bis silane ingredient, as disclosed in commonly assigned, copending U.S. application Ser. No. 08/286,089, filed Aug. 4, 1994, now abandoned, and entitled "Size Composition," which is a continuation application of U.S. application Ser. No. 07/975,254, filed Nov. 11, 1992, now abandoned, the disclosures of which are hereby incorporated by reference, may be used, for example, to make that single-end product when using the heating device 41. Other products that may be formed using the heating device 41 include: panel roving; yarn; glass fiber products for use in bulk molding compound products, sheet molding compound products, and glass fiber reinforced thermoplastic products; and other like products.

It is also contemplated that the apparatus 10 may be used to produce glass fiber packages which are only partially dry when wound onto a tube 64. Partially drying the size applied to glass fibers, e.g., such that the package moisture content is below 6%, is believed to reduce size migration in the resulting glass fiber package.

It is further contemplated that two separate glass fiber packages may be formed simultaneously using an apparatus employing the heating device 41. As such, the two packages would be positioned side-by-side at the winder station.

Figure 3:
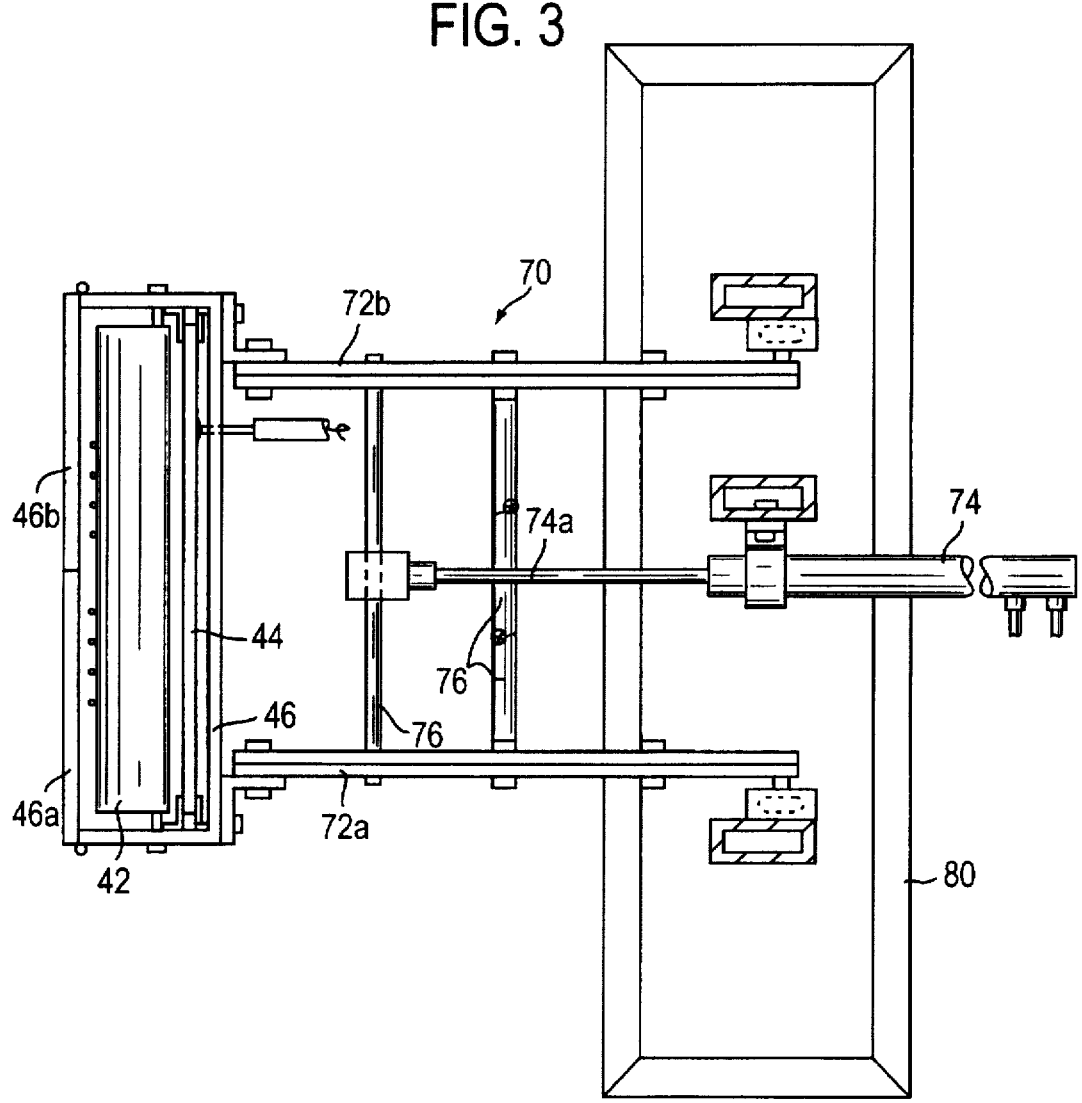
FIG. 3 is a view taken along view line 3—3 in FIG. 2.

Referring to FIG. 3, the first and second plates 42 and 44 are housed within a cabinet 46, which is moveable toward and away from the fibers 14 (shown in FIG. 1). The cabinet 46 includes first and second doors 46a and 46b which, when closed, serve as heat shields. The doors 46a and 46b are preferably formed from insulation board, such as 1 inch thick calcium silicate.

A reciprocating device 70 is provided for moving the cabinet 46 toward and away from the fibers 14 (shown in FIG. 1). The device 70 comprises first and second linkage mechanisms 72a and 72b and a piston-cylinder drive unit 74. The linkage mechanisms 72a and 72b are connected to the cabinet 46 and to a support 80. The piston-cylinder drive unit 74 extends from the support 80 and is fixedly connected to one of a plurality of support members 76 extending between the first and second linkage mechanisms 72a and 72b, see FIG. 3. Reciprocating movement of the piston 74a of the drive unit 74 effects movement of the cabinet 46 and, hence, the first plate 42.

Figure 5:
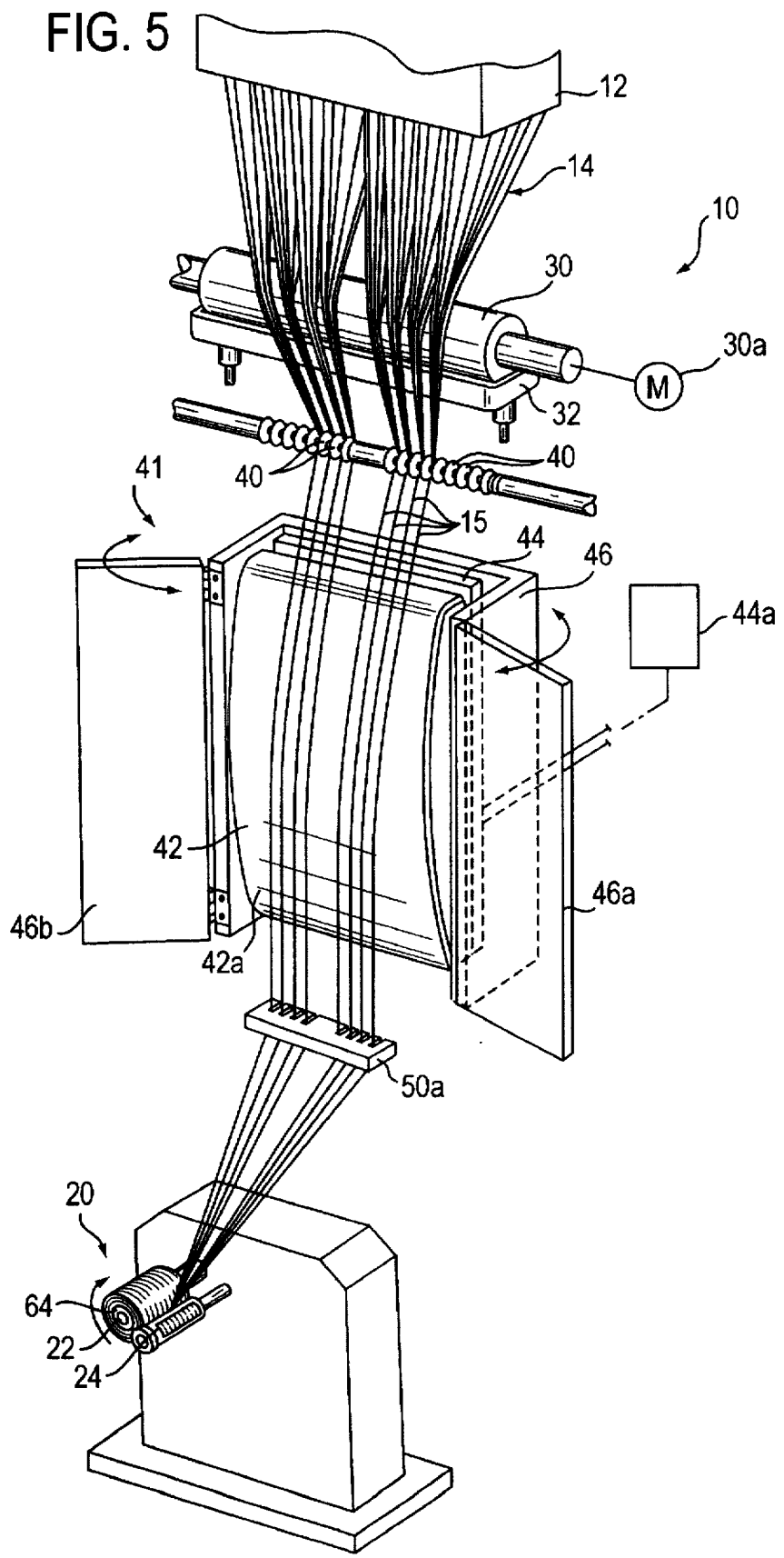
FIG. 5 is a perspective view of a glass fiber package forming apparatus constructed in accordance with a second embodiment of the present invention.

In an alternative embodiment shown in FIG. 5, where like reference numerals indicate like elements, a separating shoe 50a is used in place of the gathering shoe 50 shown in FIG. 1. In this embodiment, the spacing between the bundles 15 is maintained until the bundles 15 are gathered together at the winding device 20.

The following example is given to illustrate certain preferred details of the invention, it being understood that the details of the example are not to be taken as in any way limiting the invention thereto.

EXAMPLE 1

A multiple split gun roving product was made using the apparatus illustrated in FIG. 5. The bushing 12 included 2000 openings and was operated at a 33 lb/hour glass throughput rate. The 2000 fibers were separated into 8 bundles, with each bundle having 250 fibers. The size included on a percent by weight as received basis the following: 12.80% of a vinyl acetate copolymer emulsion, which is commercially available from Franklin International under the product name DURACET 1512; 2.13% of a polyvinyl acetate copolymer latex, which is commercially available from Franklin International under the product name DURACET 675-01; 2.13% of a vinyl acrylic copolymer emulsion, which is commercially available from Franklin International under the product name COVINAX 27A; 0.18% of an antistatic agent, which is commercially available from PPG Specialty Chemical under the product name LAROSTAT 264A; 0.012% of an amine lubricant, which is commercially available from Henkel Corporation under the product name EMERY 6760U; 0.037% of a wetting agent which is commercially available from Rhone-Poulenc under the product name IGEPAL CA630; 0.16% of a silane coupling agent which is commercially available from OSI Specialties Inc. under the product name A1100; 0.20% of a silane coupling agent which is commercially available from OSI Specialties Inc. under the product name A174; 1.52% of a fatty acid ester lubricant which is commercially available from Stepan Company under the product name KESSCO BES; 0.10% of acetic acid; and 80.73% deionized water. The total solids content of the sizing composition was 9.4 weight percent. The first plate was maintained at a temperature of approximately 1300° F. A gun roving product was produced having a tow separable into 8 bundles or strands. No evidence of size migration was found in the resultant product.

The present invention provides a novel sizing composition. The sizing is unique in that the glass strand (2000 filaments) will come out of the package as a single strand and easily separate into the eight individual (250 filament) bundles. This property arises from the particular combination of a vinyl acetate copolymer emulsion, a polyvinyl acetate copolymer latex, and a vinyl acrylic copolymer emulsion as a sizing composition when the sized fibers are dried by the process described above. This is an improvement over currently available sizing compositions. Such prior art sizing compositions produce a glass fiber product which requires a roving step to separate a glass fiber package into individual bundles. The roving process is time-consuming and adds cost to the final roving product. Eliminating the roving step by using the sizing composition of the present invention reduces the cost of the final product. Also, the present sizing will process through the wet spray-up operation and yield processing and physical properties comparable to products presently on the market.

The sized glass fibers of the present invention can be used in a variety of products. They are especially useful in glass fiber reinforced thermoset materials. In particular, the sized glass fibers of the present invention may be used as gun roving. Gun roving is an open mold spray-up glass fiber which is used for making, among other things, fiberglass boat hulls.

With the present invention, an in-line drying process is also provided which provides a number of advantages not previously found in the prior art. For example, the present invention reduces or substantially eliminates size migration in glass fiber packages and the resultant discoloration. The present invention also allows split products to be produced with reduced catenary. The present invention further permits glass fiber packages to be produced more efficiently and at lower costs.

Having described the invention in detail and by reference to preferred embodiments thereof, it will be apparent that modifications and variations are possible without departing from the scope of the invention defined in the appended claims.

What is claimed is:

1. A sizing composition for glass comprising a vinyl acetate copolymer emulsion, a polyvinyl acetate copolymer latex, and a vinyl acrylic copolymer emulsion.

2. The sizing composition of claim 1 further comprising one or more silane coupling agents.

3. The sizing composition of claim 2 further comprising a lubricant.

4. The sizing composition of claim 3 wherein said lubricant is selected from the group consisting of amines and fatty acid esters.

5. The sizing composition of claim 4 further comprising an antistatic agent.

6. The sizing composition of claim 5 further comprising a wetting agent.

7. The sizing composition of claim 6 further comprising acetic acid.

8. The sizing composition of claim 1 wherein said vinyl acetate copolymer emulsion is present in said sizing composition in a solids weight percent of from about 2.5 to about 12.5 percent.

9. The sizing composition of claim 8 wherein said vinyl acetate copolymer emulsion is present in said sizing composition in a solids weight percent of from about 5 to about 7.5 percent.

10. The sizing composition of claim 9 wherein said vinyl acetate copolymer emulsion is present in said sizing composition in a solids weight percent of about 6.5 percent.

11. The sizing composition of claim 1 wherein said polyvinyl acetate copolymer latex is present in said sizing composition in a solids weight percent of from about 0.25 to about 2.5 percent.

12. The sizing composition of claim 11 wherein said polyvinyl acetate copolymer latex is present in said sizing composition in a solids weight percent of from about 0.5 to about 1.5 percent.

13. The sizing composition of claim 12 wherein said polyvinyl acetate copolymer latex is present in said sizing composition in a solids weight percent of about 1 percent.

14. The sizing composition of claim 1 wherein said vinyl acrylic copolymer emulsion is present in said sizing composition in a solids weight percent of from about 0.25 to about 2.5 percent.

15. The sizing composition of claim 14 wherein said vinyl acrylic copolymer emulsion is present in said sizing composition in a solids weight percent of from about 0.5 to about 1.5 percent.

16. The sizing composition of claim 15 wherein said vinyl acrylic copolymer emulsion is present in said sizing composition in a solids weight percent of about 1 percent.

17. A product comprising glass fiber coated with a sizing composition comprising a vinyl acetate copolymer emulsion, a polyvinyl acetate copolymer latex, and a vinyl acrylic copolymer emulsion.

18. The product of claim 17 wherein said vinyl acetate copolymer emulsion is present in said sizing composition in a solids weight percent of from about 2.5 to about 12.5 percent.

19. The product of claim 17 wherein said polyvinyl acetate copolymer latex is present in said sizing composition in a solids weight percent of from about 0.25 to about 2.5 percent.

20. The composition of claim 17 wherein said vinyl acrylic copolymer emulsion is present in said sizing composition in a solids weight percent of from about 0.25 to about 2.5 percent.

* * * * *